US009928147B2

(12) United States Patent
Li et al.

(10) Patent No.: US 9,928,147 B2
(45) Date of Patent: Mar. 27, 2018

(54) FORCEFUL CLOSURE AND AUTOMATIC RECOVERY OF PLUGGABLE DATABASES IN A SHARED-EVERYTHING CLUSTER MULTITENANT CONTAINER DATABASE

(71) Applicant: Oracle International Corporation, Redwood Shores, CA (US)

(72) Inventors: Yunrui Li, Fremont, CA (US); Chi Cao Minh, San Mateo, CA (US); Wilson Chan, San Francisco, CA (US); Tolga Yurek, Foster City, CA (US); Ping-Hsiu Hsieh, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 139 days.

(21) Appl. No.: 15/014,969

(22) Filed: Feb. 3, 2016

(65) Prior Publication Data
US 2017/0220428 A1 Aug. 3, 2017

(51) Int. Cl.
*G06F 11/14* (2006.01)
*G06F 17/30* (2006.01)

(52) U.S. Cl.
CPC ...... *G06F 11/1471* (2013.01); *G06F 17/3056* (2013.01); *G06F 2201/80* (2013.01); *G06F 2201/805* (2013.01); *G06F 2201/85* (2013.01)

(58) Field of Classification Search
CPC .............. G06F 11/1471; G06F 11/1469; G06F 17/30566
USPC .............................. 714/19; 707/703, 648, 683
See application file for complete search history.

(56) References Cited

U.S. PATENT DOCUMENTS

| 5,408,653 | A | * | 4/1995 | Josten ............... G06F 17/30362 |
| 6,804,671 | B1 | | 10/2004 | Loalza et al. |
| 7,822,717 | B2 | | 10/2010 | Kopper et al. |
| 8,364,648 | B1 | | 1/2013 | Sim-Tang |
| 9,684,566 | B2 | * | 6/2017 | Li ....................... G06F 11/1469 |

(Continued)

OTHER PUBLICATIONS

Rajeev Kumar et al., Oracle DBA, A Helping Hand, Container Database and Pluggable Database (CDB & PDB), retrieved from the internet on Dec. 4, 2013, 2 pages.

(Continued)

*Primary Examiner* — Kamini B Patel
(74) *Attorney, Agent, or Firm* — Hickman Palermo Becker Bingham LLP

(57) ABSTRACT

Embodiment provide that each pluggable database (PDB) in a container database is associated with a distinct distributed lock manager (DLM) domain. Thus, in order to access a PDB, a database server instance joins the DLM domain for the PDB. To perform actions on the PDB, the instance secures locks that belong to the DLM domain for the particular PDB. As such, buffers storing data for the PDB may be managed separately from buffers storing data for other PDBs using the PDB-specific DLM domains. An instance forcefully closing a particular PDB marks the DLM domain of the PDB as invalid, which allows detection of the forceful closure by a recovery instance. Detection of an invalid DLM domain by an instance causes the instance to automatically recover the PDB by accessing pertinent ranges of redo logs and replaying changes made to data blocks for the PDB indicated in the logs.

28 Claims, 5 Drawing Sheets

(56) References Cited

U.S. PATENT DOCUMENTS

| | | |
|---|---|---|
| 2002/0112022 A1 | 8/2002 | Kazar et al. |
| 2003/0061537 A1 | 3/2003 | Cha et al. |
| 2004/0267809 A1 | 12/2004 | East et al. |
| 2005/0038831 A1 | 2/2005 | Souder et al. |
| 2007/0083563 A1 | 4/2007 | Souder |
| 2007/0100912 A1 | 5/2007 | Pareek et al. |
| 2007/0244918 A1 | 10/2007 | Lee et al. |
| 2010/0318570 A1 | 12/2010 | Narasinghanallur et al. |
| 2011/0004586 A1 | 1/2011 | Cherryholmes et al. |
| 2011/0060724 A1* | 3/2011 | Chan .................. G06F 11/1469 707/683 |
| 2011/0087633 A1 | 4/2011 | Kreuder et al. |
| 2011/0307450 A1 | 12/2011 | Hahn et al. |
| 2012/0109926 A1 | 5/2012 | Novik et al. |
| 2013/0085742 A1 | 4/2013 | Baker et al. |
| 2013/0117237 A1* | 5/2013 | Thomsen .......... G06F 17/30377 707/683 |
| 2013/0212068 A1 | 8/2013 | Talius et al. |
| 2014/0095452 A1* | 4/2014 | Lee .................... G06F 11/1471 707/683 |
| 2014/0095530 A1 | 4/2014 | Lee et al. |
| 2014/0095546 A1 | 4/2014 | Kruglikov et al. |
| 2014/0164331 A1* | 6/2014 | Li ...................... G06F 11/1471 707/648 |
| 2015/0254240 A1* | 9/2015 | Li .................... G06F 17/30575 707/703 |
| 2016/0210201 A9 | 7/2016 | Li |
| 2017/0116282 A1* | 4/2017 | Jain .................. G06F 17/30513 |
| 2017/0116298 A1* | 4/2017 | Ravipati .......... G06F 17/30368 |
| 2017/0116435 A1* | 4/2017 | Shanthaveerappa ........................ G06F 17/3033 |
| 2017/0220271 A1* | 8/2017 | Muthukrishnan ..... G06F 3/0616 |

OTHER PUBLICATIONS

Preimesberger, Chris, "Oracle Profits Up, but Revenues Slip" Oracle, dated Sep. 20, 2012, 2 pages.

Oracle Base, Multitenant: Create and agonfigure a Pluggable Database (PDB) in Oracle Database 12c Release 1 (12.1), dated Jan. 8, 2014, 16 pages.

Muhammad Anwar, "How to Install Oracle 12c Multitenant Pluggable Database", Dated Feb. 24, 2012, 27 pages.

Garcia-Molina et al., "Database System Implementation", dated Jan. 1, 2000, 84 pages.

Francisco Munoz et al., "Oracle Database 12c Backup and Recovery Survival Guide", dated Sep. 24, 2013, 8 pages.

Dominic Betts et al., "Developing Multi-Tenant Applications for the Cloud," 3rd Edition, Microsoft, 2012, 246 pages.

Das et al., "Albatross: Lightweight Elasticity in Shared Storage Databases for the Cloud Using Live Data Migration", Proceedings of the VLDB Endowment, vol. 4 No. 8 Copyright, dated 2011, 12 pages.

Anonymous: "Oracle-Base—Multitenant: Overview of Container Databases (CDB) and Pluggable Databases (PDB)", dated Mar. 3, 2014, 4 pages.

Anonymous, :An Oracle White Paper Oracle Database Appliance: Migration Strategies, dated Jun. 2012, 14 pages.

Oracle7 Enterprise Backup Utility Adminstrator's Guide, dated 1997, Oracle Corporation, 20 pages.

DBA, I Practice-Control and Redo Log Files, Computer Science and Engineering Department, dated Nov. 1, 2009, http://andrei.clubcisco.ro/cursuri/5master/abd/4._control_and_Redo_log_files, 27 pages.

U.S. Appl. No. 13/830,349, filed Mar. 14, 2013, Office Action, dated Nov. 5, 2014.

U.S. Appl. No. 13/830,349, filed Mar. 14, 2013, Notice of Allowance, dated Oct. 19, 2015.

U.S. Appl. No. 13/830,349, filed Mar. 14, 2013, Interview Summary, dated Mar. 9, 2015.

U.S. Appl. No. 13/830,349, filed Mar. 14, 2013, Final Office Action, dated Jun. 2, 2015.

U.S. Appl. No. 13/631,815, filed Sep. 28, 2012, Office Action, dated Nov. 6, 2014.

U.S. Appl. No. 13/631,815, filed Sep. 28, 2012, Notice of Allowance, dated Aug. 20, 2015.

U.S. Appl. No. 13/631,815, filed Sep. 8, 2012, Notice of Allowance, dated Apr. 3, 2015.

U.S. Appl. No. 13/631,815, filed Sep. 28, 2012, Office Action, dated Dec. 23, 2013.

U.S. Appl. No. 13/631,815, filed Sep. 28, 2012, Office Action, dated May 29, 2014.

U.S. Appl. No. 14/135,202, filed Dec. 19, 2013, Office Action , dated Jul. 5, 2016.

Li, U.S. Appl. No. 14/135,202, filed Dec. 19, 2013, Notice of Allowance dated Jan. 27, 2017.

Muhammad Anwar, "How to Install Oracle 12c Multitenant Pluggable Database", dated on Feb. 24, 2012, 27 pages.

\* cited by examiner

302: A PARTICULAR DATABASE SERVER INSTANCE ACCESSING A PARTICULAR PLUGGABLE DATABASE, OF A PLURALITY OF PLUGGABLE DATABASES WITHIN A CONTAINER DATABASE, BASED ON THE PARTICULAR DATABASE SERVER INSTANCE BEING A MEMBER OF A PARTICULAR DLM DOMAIN THAT CORRESPONDS TO THE PARTICULAR PLUGGABLE DATABASE

304: AFTER THE PARTICULAR DATABASE SERVER INSTANCE ACCESSING THE PARTICULAR PLUGGABLE DATABASE, THE PARTICULAR DATABASE SERVER INSTANCE DETECTING A TRIGGER EVENT THAT TRIGGERS FORCEFUL CLOSURE OF THE PARTICULAR PLUGGABLE DATABASE

306: LEAVING THE PARTICULAR DLM DOMAIN THAT CORRESPONDS TO THE PARTICULAR PLUGGABLE DATABASE

308: DROPPING ONE OR MORE DIRTY BUFFERS STORING DATA OF THE PARTICULAR PLUGGABLE DATABASE

FIG. 4

402 — A PARTICULAR DATABASE SERVER INSTANCE DETECTING THAT A PARTICULAR DLM DOMAIN, ASSOCIATED WITH A PARTICULAR PLUGGABLE DATABASE OF A PLURALITY OF PLUGGABLE DATABASES WITHIN A CONTAINER DATABASE, IS MARKED INVALID

404 — IN RESPONSE TO THE PARTICULAR DATABASE SERVER INSTANCE DETECTING THAT THE PARTICULAR PLUGGABLE DATABASE IS MARKED INVALID, THE PARTICULAR DATABASE SERVER INSTANCE AUTOMATICALLY RECOVERING THE PARTICULAR PLUGGABLE DATABASE

406 — RETRIEVING INFORMATION INDICATING: A PARTICULAR REDO THREAD OF A PLURALITY OF REDO THREADS OF A REDO LOG, AND A RANGE OF ENTRIES IN THE PARTICULAR REDO THREAD

408 — IDENTIFYING, FROM THE PARTICULAR REDO THREAD, ONE OR MORE RECOVERY DATA BLOCKS

410 — FETCHING DATA FOR A LATEST VERSION OF THE ONE OR MORE RECOVERY DATA BLOCKS

412 — REPLAYING, IN THE DATA FOR THE LATEST VERSION OF THE ONE OR MORE RECOVERY DATA BLOCKS, ONE OR MORE CHANGES INDICATED IN REDO ENTRIES THAT ARE RECORDED IN THE PARTICULAR REDO THREAD WITHIN THE RANGE OF ENTRIES, TO PRODUCE ONE OR MORE RECOVERED DATA BLOCKS

414 — STORING THE ONE OR MORE RECOVERED DATA BLOCKS TO DISK

FORCEFUL CLOSURE AND AUTOMATIC RECOVERY OF PLUGGABLE DATABASES IN A SHARED-EVERYTHING CLUSTER MULTITENANT CONTAINER DATABASE

CROSS-REFERENCE TO RELATED APPLICATIONS

This application is related to each of the following applications, the entire contents of each of which is hereby incorporated by reference as if fully set forth herein:
application Ser. No. 13/631,815, filed Sep. 28, 2012, titled "Container Database";
application Ser. No. 13/830,349, filed Mar. 14, 2013, titled "In Place Point-In-Time Recovery Of Pluggable Databases"; and
application Ser. No. 14/135,202, filed Dec. 19, 2013, titled "Techniques To Backup Restore And Recovery Of A Pluggable Database".

FIELD OF THE INVENTION

The present invention relates to forceful closure and recovery of pluggable databases, and, more specifically, to forceful closure and recovery of pluggable databases using pluggable database-specific distributed lock manager domains.

BACKGROUND

Database consolidation involves distributing and sharing computing resources among multiple databases. In non-consolidated databases, database backup and recovery may be performed on a per-database basis. However, in a consolidated database or other in-database virtualizations capable of consolidating multiple databases, traditional database backup and recovery practices cannot be carried out on a per-database basis with the same behavior expected of a non-consolidated database.

In a consolidated database, such as a multitenant container database (CDB), a database server instance serving a particular pluggable database (PDB) can handle certain PDB-specific failures with fully managed closure of the PDB (i.e., persisting any changed data to disk in the process of closing the PDB connection). However, some circumstances require forceful closure of a PDB, where the closure does not involve disk access.

Generally, all locks obtained by the database server instance (including locks pertaining to PDB-specific media) belong to the instance. As such, locks obtained for individual PDBs being served by the database server instance are managed jointly as belonging to the instance (or to a distributed lock manager (DLM) domain to which all locks obtained by the instance are scoped). Under these conditions, in order to forcefully close any portion of the locks obtained by the instance, the entire instance is terminated thereby exiting the instance's DLM domain and terminating all locks that are scoped to that instance's DLM domain.

In other words, because all locks obtained by a database server instance are managed jointly, forcefully closing only an individual PDB that has failed is generally infeasible because, in a shared-everything cluster configuration, the buffer cache for the instance may contain dirty buffers belonging to the failed PDB. These dirty buffers cannot be written to disk as part of the forceful closure of only the failed PDB because the specific individual PDB failure may be that the database instance loses connectivity to the storage where the specific PDB's data are stored. If these dirty buffers are discarded instead, without recovery of required changes lost in the discarded buffers, changes based on stale block versions from other cluster nodes would cause logical inconsistency.

Crashing a database server instance because of a PDB-specific failure has many disadvantages, including unnecessarily reducing the availability of all of the properly-functioning PDBs served by the crashed instance. It would be beneficial to allow a database server instance to forcefully close a failed PDB, being served by the instance, without affecting the availability of the other PDBs being served by the database server instance. Furthermore, it would be beneficial to enable database systems to automatically recover PDBs that have been forcefully closed.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:
FIG. 3 depicts a flowchart for forcefully closing a particular pluggable database by a database server instance based on a pluggable database-specific distributed lock manager domain.
FIG. 4 depicts a flowchart for automatically recovering a pluggable database that has been forcefully closed.

DETAILED DESCRIPTION

Figure 1:
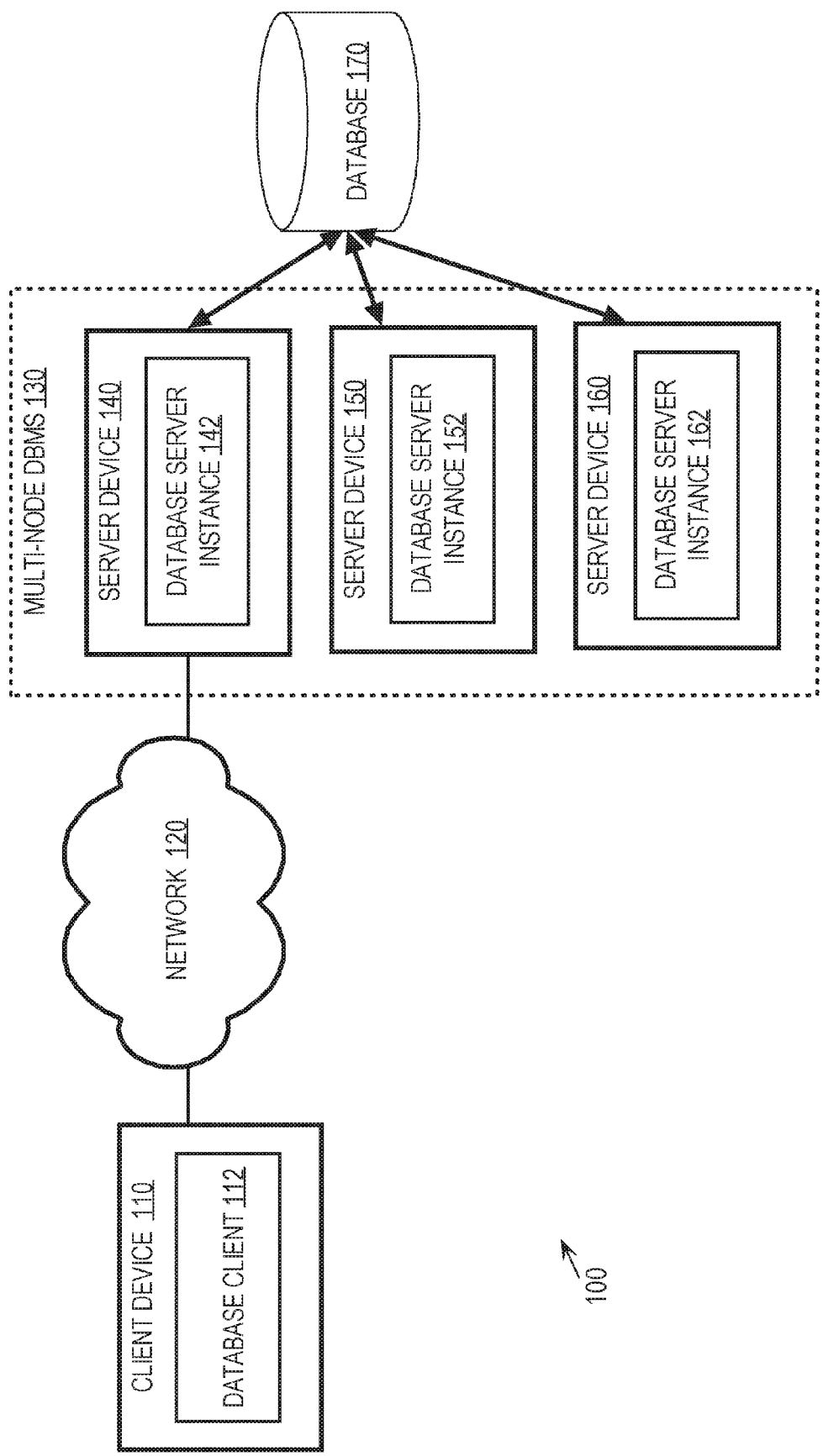
FIG. 1 is a block diagram that depicts an example network arrangement for forcefully closing and automatically recovering individual pluggable databases.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In a consolidated database such as a multitenant container database (CDB), certain trigger events, including pluggable database (PDB) failures that are limited to the scope of the PDB, trigger forceful closure of the individual pluggable database that is subject to the trigger event. Forcefully closing a failed PDB (rather than simply crashing a database server instance that detects the trigger precipitating the PDB closure) allows the database server instance to maintain availability of other PDB connections that are not affected.

According to embodiments, a PDB that is in a shared-everything cluster multitenant container database (CDB) is closed in a way that: (1) does not require access to the PDB files and (2) does not affect the availability of other PDBs in the CDB. Nodes in the cluster, other than a node that forcefully closed a particular PDB, automatically recovers the forcefully closed PDB so that the PDB can continue to be accessed and later re-opened quickly. A PDB that is forcefully closed is automatically recovered by a recovery database server instance.

In order to forcibly close particular individual PDBs, each PDB contained in a CDB is associated with a distinct distributed lock manager (DLM) domain under which all locks taken out for the corresponding PDB is managed. Because each PDB is associated with its own distinct DLM domain, in order to access a PDB, a particular database server instance joins the DLM domain for the PDB and secures locks, on PDB-specific resources, that are scoped to the DLM domain for the particular PDB. As such, all changes to a PDB are tied to the corresponding DLM domain, and the buffers storing data for the PDB may be managed separately from buffers, managed by a particular instance, that store data for other PDBs.

Database server instances utilize the PDB-specific DLM domains to forcefully close a given PDB. A database server instance forcefully closing a particular PDB marks the DLM domain of the PDB as invalid, which allows detection of the forceful closure by a recovery database server instance. Detection of an invalid DLM domain by a database server instance attempting to access a PDB that has been forcefully closed causes the instance to automatically recover the PDB. To recover the PDB, the recovery instance accesses pertinent ranges of redo logs and replays changes made to data blocks for the PDB indicated in the logs.

Accordingly, a particular PDB may be forcefully closed and automatically recovered without crashing a database server instance that is serving the PDB and without affecting the availability of other PDBs in the CDB.

Architecture for Pluggable Database Forceful Closure and Automatic Recovery

FIG. 1 is a block diagram that depicts an example network arrangement 100 for forcefully closing and automatically recovering individual pluggable databases, according to embodiments. Network arrangement 100 includes a client device 110 and server devices 140, 150, and 160 communicatively coupled via a network 120. Example network arrangement 100 may include other devices, including client devices, server devices, storage devices, and display devices, according to embodiments.

Client device 110 may be implemented by any type of computing device that is communicatively connected to network 120. Example implementations of client device 110 include, without limitation, workstations, personal computers, laptop computers, personal digital assistants (PDAs), tablet computers, cellular telephony devices such as smart phones, and any other type of computing device.

In network arrangement 100, client device 110 is configured with a database client 112. Database client 112 may be implemented in any number of ways, including as a stand-alone application running on client device 110, or as a plugin to a browser running at client device 110, etc. Database client 112 may be implemented by one or more logical modules. Client device 110 may be configured with other mechanisms, processes and functionalities, depending upon a particular implementation.

Network 120 may be implemented with any type of medium and/or mechanism that facilitates the exchange of information between client device 110 and any of server devices 140, 150, and 160. Furthermore, network 120 may facilitate use of any type of communications protocol, and may be secured or unsecured, depending upon the requirements of a particular embodiment.

According to embodiments, server devices 140, 150, and 160 are nodes of a cluster of nodes—managed by a multi-node database management system (DBMS) 130—that store and/or serve data from a database 170. According to an embodiment, multi-node DBMS 130 represents a shared-everything cluster database environment (such as Oracle RAC). According to embodiments, any number of nodes may be part of the node cluster managed by multi-node DBMS 130. Server devices 140, 150, and 160 are implemented by any type of computing device that is capable of communicating with client device 110 over network 120 and capable of running a database server instance. Alternatively or additionally, one or more of server devices 140, 150, and 160 comprise the nodes of a grid, which is composed of nodes in the form of server blades interconnected with other server blades on a rack.

In network arrangement 100, server devices 140, 150, and 160 are configured with database server instances 142, 152, and 162, respectively. Database server instances 142, 152, and 162, installed on the nodes managed by multi-node DBMS 130, collectively implement the database server being managed by DBMS 130. Specifically, resources from multiple nodes in a multi-node database system can be allocated to run a particular database server's software. Each combination of the software and allocation of resources from a node is a server that is referred to herein as a "database server instance" or "instance".

A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients (such as database client 112 on client device 110).

Server devices 140, 150, and 160 share access to the same database (i.e., database 170). Specifically, according to embodiments, the nodes of multi-node DBMS 130 share access, potentially in varying degrees, to shared storage that stores the data for database 170. According to an embodiment, this shared access comprises access to a set of disk drives (on or accessible by the nodes of multi-node DBMS 130) and to data blocks stored thereon. Database 170 may reside in any type of storage, including volatile and non-volatile storage, e.g., random access memory (RAM), one or more hard disks, main memory, etc.

One or more of the functions attributed to server device 140, 150, and/or 160 herein may be performed by services on other server devices that are communicatively coupled to network 120. Furthermore, any of the functionality attributed to database server instances 142, 152, and 162 herein may be performed by another logical entity of network arrangement 100, according to embodiments. Also, database server instances 142, 152, and 162 may each be implemented by one or more logical modules, and are described in further detail below. Server devices 140, 150, and 160 may be configured with other mechanisms, processes and functionalities, depending upon a particular implementation.

Database client 112 and/or any of database server instances 142, 152, and 162 may receive and respond to Application Programming Interface (API) calls, Simple Object Access Protocol (SOAP) messages, requests via HyperText Transfer Protocol (HTTP), HyperText Transfer Protocol Secure (HTTPS), Simple Mail Transfer Protocol (SMTP), or any other kind of communication, e.g., from other entities communicatively coupled to network 120. Further, database client 112 and/or any database server instance may send one or more communications, using any of the above protocols or any other communication protocol, over network 120 to one of the other entities communicatively coupled to network 120, according to embodiments.

In an embodiment, each of the processes and/or functionality described in connection with database client 112, database server instances 142, 152, and 162, DBMS 130, and/or database 170 are performed automatically and may be implemented using one or more computer programs, other software elements, and/or digital logic in any of a general-purpose computer or a special-purpose computer, while performing data retrieval, transformation, and storage operations that involve interacting with and transforming the physical state of memory of the computer.

Database Systems

Embodiments of the present invention are used in the context of database management systems (DBMSs). Therefore, a description of a DBMS is useful. A DBMS manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with an instance of a database server of a DBMS by submitting to the database server instance commands that cause the database server instance to perform operations on data stored in a database. For example, a user at client device 110 submits a database server command to multi-node DBMS 130, via database client 112, which is received by a particular database server instance with which database client 112 maintains a connection, e.g., database server instance 142. A user may be one or more applications running on client device 110 that causes database client 112 to interact with database server instance 142. Multiple users may also be referred to herein, collectively, as a user.

A database command may be in the form of a database statement that conforms to a database language. An illustrative example database language for expressing database commands is the Structured Query Language (SQL). For example, data manipulation language (DML) instructions are issued to a DBMS to manage data stored within a database structure, and SELECT, INSERT, UPDATE, and DELETE are common examples of DML instructions found in some SQL implementations.

Container Database and Pluggable Database Architecture

Figure 2:
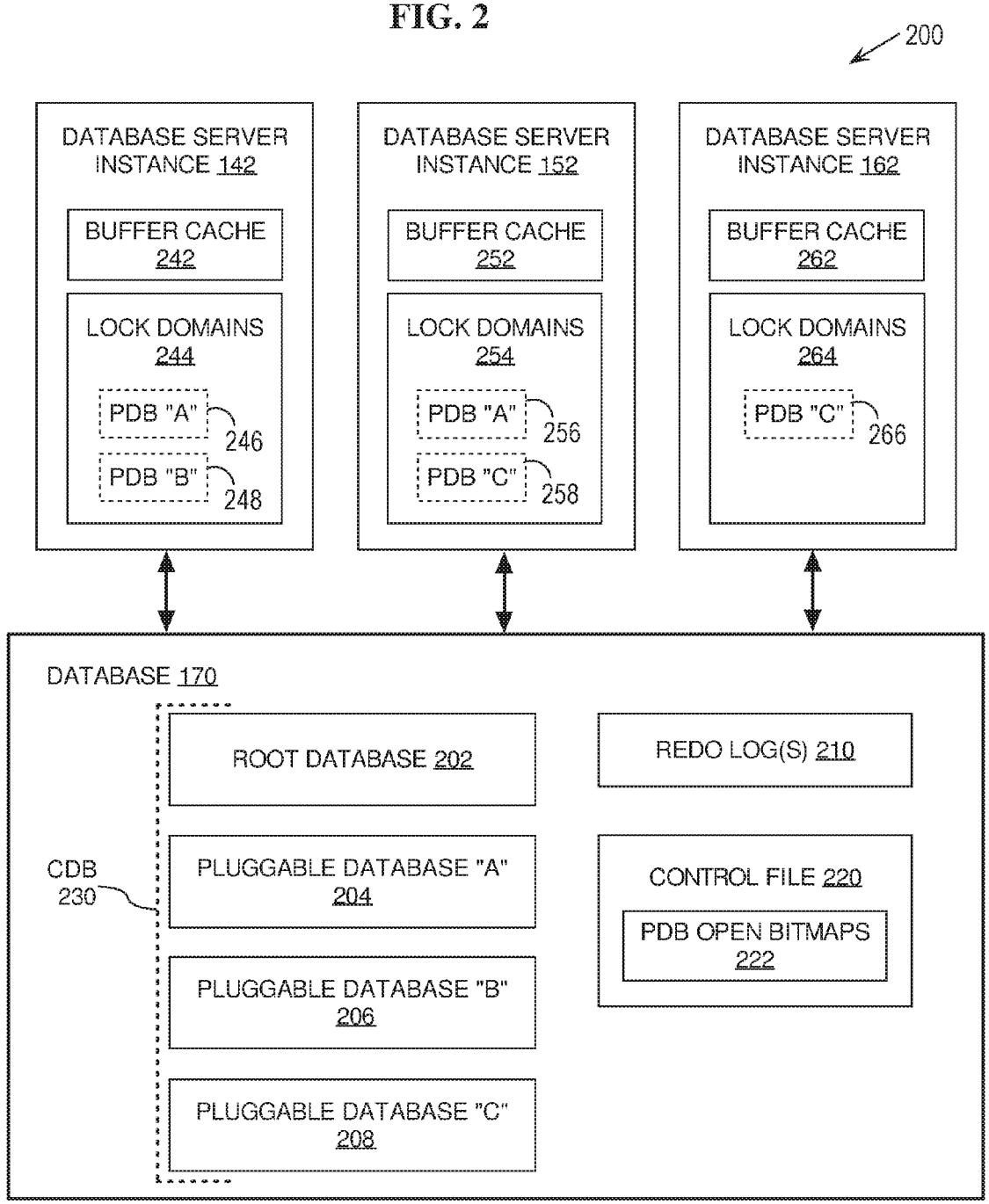
FIG. 2 depicts an example resource arrangement detailing database server instances and a database.

FIG. 2 is a more detailed depiction of database server instances 142, 152, and 162, and also of database 170. Specifically, database 170 includes a root database 202 that represents the data for a container database (CDB) 230. CDB 230 contains pluggable databases (PDB) "A" (204), PDB "B" (206) and PDB "C" (208). According to embodiments, CDB 230 may contain any number of pluggable databases, notwithstanding the number of pluggable databases depicted in FIG. 2. Database 170 also includes redo log(s) 210, and a control file 220 with PDB open bitmaps 222 described in further detail below. Redo log(s) 210 includes a distinct redo thread for each database server instance serving database 170. A redo thread for a particular database server instance is a set of redo logs that are specific to that instance and stores redo entries recording actions taken by only the associated instance.

A container database, such as CDB 230, that includes one or more pluggable databases provides in-database virtualization for consolidating the multiple separate pluggable databases. Pluggable databases may be "plugged in" to a container database, and may be transported between database servers and/or DBMSs. CDB 230 allows multiple pluggable databases (e.g., PDBs 204, 206, and/or 208) to run on the same database server and/or database server instance, allowing the computing resources of a single database server or instance to be shared between multiple pluggable databases.

CDB 230 provides database isolation between its pluggable databases (PDBs 204, 206, and 208) such that users of a database session established for a particular pluggable database may only access or otherwise view database objects defined via the attached pluggable database dictionary corresponding to the user's database session. The isolation also extends to namespaces. Each pluggable database has its own namespace for more types of database objects. With respect to each of PDBs 204, 206, and 208 in CDB 230, the name uniqueness requirement of the associated tablespaces and schemas is also only confined to individual pluggable databases.

Root Database

Root database 202 is a database used to globally manage CDB 230, and to store metadata and/or data for "common database objects" to manage access to PDBs 204, 206, and 208. Although root database 202 is depicted in FIG. 2 as a separate database within database 170, other architectural implementations for storing common database objects for a container database may be used within embodiments.

Accessing Pluggable Databases Using DLM Domains

Although PDBs 204, 206, and 208 share resources, they may be accessed independently. In one embodiment, a user connected to a specific pluggable database is not exposed to the underlying structure utilized for database consolidation, and the specific pluggable database appears as an independent database system.

A database session comprises a particular connection established for a client (e.g., database client 112) to a database server instance (e.g., database server instance 142) through which the client issues a series of database requests. In order to serve a session with a particular PDB, database server instance 142 establishes a connection with the requested PDB. For example, server instance 142 establishes a connection with PDB 204 and with PDB 206, respectively. Server instances 152 and 162 may establish connections with one or more of the same pluggable databases as server instance 142 and/or one or more other pluggable databases.

According to embodiments, each PDB in CDB 230 is associated with a distinct corresponding DLM domain, and, in the process of a database server instance establishing a connection with a particular PDB, the instance joins the DLM domain that corresponds with the particular PDB. DLM is a set of infrastructure (processes and data structures) that maintains a list of system resources and provides locking mechanisms to control allocation and modification of resources. A DLM resource represents some entity (e.g., in database 170) to which shared access is controlled, such as a table, record, field, object, etc.

Every process interested in a resource protected by the DLM must open a lock on the resource. A lock is a data structure that indicates that a particular process has been granted certain rights with respect to the resource. All locks that a database server instance obtains for resources of a particular PDB are scoped to the DLM domain that corresponds to the particular PDB. According to embodiments, a lock is scoped to a particular DLM domain based on one or more of the following: including, in information for the lock, an identifier of the particular DLM domain; including, in information for the lock, an identifier of the PDB that is the source of the locked resource; including information for the lock in a list of locks scoped to the particular DLM domain (e.g., in a lock structure that holds information for locks scoped to the particular DLM domain); etc. Therefore, according to embodiments, the locks obtained for PDBs by a database server instance are not associated with the instance, but rather with DLM domains corresponding to individual PDBs.

By maintaining separate DLM domains for each PDB, locks obtained for a particular PDB may be managed independently from locks obtained for any other PDB. In this manner, a database server instance can leave a particular PDB-specific DLM domain without leaving any other DLM domain for other PDBs to which the database server instance is connected. Therefore, when a database server instance detects a trigger event that triggers forceful closure of a particular PDB (as described in further detail below) the database server instance may leave the DLM domain for the particular PDB without affecting functionality of any other PDB to which the instance is connected.

Joining a PDB-Specific DLM Domain

According to embodiments, to join a DLM domain that corresponds to a particular PDB, a particular database server instance performs at least one of:

causing an identifier of the particular database server instance to be added to a bitmap that lists members of the DLM domain that corresponds to the particular PDB;
 broadcasting a message to other database server instances that the particular database server instance has joined the DLM domain; and
 creating a lock structure to hold information for locks that the particular database server instance obtains on resources for the particular PDB, which locks will belong to the DLM domain.

The following is an illustration of database server instance 142 joining the DLM domain for PDB 204 in connection with server instance 142 initiating a connection with PDB 204. Database server instance 142 causes the addition of an identifier of server instance 142 to a bitmap, of PDB open bitmaps 222, that lists the members of the domain for PDB 204. According to embodiments, PDB open bitmaps 222 includes a bitmap for each PDB in CDB 230, which, respectively, lists the members of the DLM domain corresponding to that PDB. Also according to embodiments, PDB open bitmaps 222 is accessible by all database server instances managed by DBMS 130.

Furthermore, database server instance 142 causes a message, to be broadcast to the other database server instances managed by DBMS 130, indicating that server instance 142 has joined the DLM domain for PDB 204. As such, all of the database server instances being managed by DBMS 130 have information indicating which database server instances are members of which PDB-specific DLM domains at any given time.

Server instance 142 also creates a lock structure 246, in lock domains 244, to hold information for locks that server instance 142 obtains for the resources of PDB 204. According to embodiments, lock structure 246 is associated with the DLM domain identifier for the DLM domain associated with PDB 204. Furthermore, according to embodiments, a lock structure may be implemented by any structure that is capable of storing lock information, such as: a linked list, a hash table, etc.

To access a resource of PDB 204, database server instance 142 obtains a lock for the resource, where the lock is scoped to the DLM domain corresponding to PDB 204. Information for the lock is stored in lock structure 246. Once the lock is obtained for the resource, database server instance 142 is free to access that resource based on the level of access granted by the lock.

Once database server instance 142 no longer requires access to the resource, instance 142 releases the lock on the resource. When database server instance 142 releases the lock, instance 142 performs one of: removing the information for the lock from lock structure 246; or marking the lock as released within the information for the lock included in lock structure 246. Therefore, the information in lock structure 246 may be utilized as a list of unreleased locks that instance 142 has obtained for PDB 204.

Database server instance 142 may be attached to multiple independent DLM domains corresponding, respectively, to multiple PDBs to which database server instance 142 is connected. For example, database server instance 142 also connects with PDB 206 by joining the DLM domain for PDB 206. Database server instance 142 creates a lock structure 248 to hold information for the locks obtained by server instance 142 for PDB 206. Thus, the information for locks specific to the multiple PDBs with which server instance 142 is connected are maintained in respective and distinct lock structures of lock domains 244.

Forceful Closure of a Pluggable Database

At any given time, the buffer cache managed by a database server instance may store dirty buffers for a PDB to which the instance is connected. A dirty buffer for a PDB is a buffer containing a data block from the PDB that has been changed in the buffer but has not yet been written to disk. Since these dirty buffers include changes that have not yet been stored to disk, discarding the buffers could result in data loss. However, forceful closure of a PDB is performed without requiring access to PDB resources on disk, which means that the dirty buffers cannot be written to disk in connection with forceful closure of the PDB.

Because each PDB in CDB 230 is associated with its own distinct DLM domain, the dirty buffers with unsaved changes for a particular PDB are each associated with locks that belong to the DLM domain for the particular PDB. Because all locks for a particular PDB are scoped to a DLM domain corresponding to the PDB (and corresponding to no other PDB), the buffers storing data for a PDB that is to be forcefully closed may be managed separately (via the DLM domain) from buffers storing data for other PDBs being served by the instance that is closing the PDB. FIG. 3 depicts a flowchart 300 for forcefully closing a particular PDB by a database server instance based on a PDB-specific DLM domain.

At step 302, a particular database server instance accesses a particular pluggable database of a plurality of pluggable databases within a container database based, at least in part, on the particular database server instance being a member of a particular DLM domain that corresponds to the particular pluggable database. For example, database server instance 142 has joined the DLM domain associated with PDB 204 and, as such, has the ability to request locks enabling access to the resources of PDB 204. As described above, each of PDBs 204, 206, and 208 is associated with a distinct corresponding DLM domain. In order to access any given PDB, a database server instance, such as server instance 142, joins the DLM domain that corresponds to the PDB.

In order to access a particular resource (e.g., a particular data block) from PDB 204, database server instance 142 obtains a lock on the particular resource where the lock is scoped to the DLM domain associated with PDB 204. Once the lock is granted, database server instance 142 stores information for the lock in lock structure 246. A database server instance only accesses resources for which the instance has obtained a granted lock.

Trigger Event that Triggers Forceful Closure of PDB

In the process of serving data for a particular PDB, server instance 142 may encounter a circumstance requiring forceful closure of the PDB. According to embodiments, only the particular PDB is forcefully taken offline without requiring termination of instance 142.

Returning to flowchart 300, at step 304, after the particular database server instance accesses the particular pluggable database, the particular database server instance detects a trigger event that triggers forceful closure of the particular pluggable database. For example, while database server instance 142 is a member of the DLM domain for PDB 204, database server instance 142 detects a trigger event that requires forceful closure of PDB 204.

According to embodiments, the set of trigger events that can cause forceful closure of a PDB includes one or more of: the resources for the PDB have become inaccessible to a particular database server instance; the resources for PDB 204 include one or more fatal abnormalities (one example of a fatal abnormality occurs when certain in-memory data, that is specific to the PDB, has become corrupt, such as due to an unknown software bug); a procedure internal to a database server instance that requires forceful closure of the PDB; forceful closure of a database server instance that had joined the DLM domain of the PDB; forceful closure of a container database that contains the PDB; a client command to forcefully close the PDB; etc. As indicated, a trigger event may be initiated by a user, or initiated by a database server instance of multi-node DBMS 130. To illustrate the trigger event of resources for a particular PDB becoming inaccessible to a particular database server instance, such inaccessibility may be caused by impaired connectivity between a server device that hosts the instance detecting the trigger event and a device that hosts the resources for the particular PDB.

The detection by instance 142 of the trigger event triggers initiation, by instance 142, of forceful closure of PDB 204. Closing the PDB for these trigger events must be forceful, since closure of the PDB must succeed even in the absence of PDB media access (which could be the reason for the forceful closure). As such, database server instance 142 initiates procedures for forcefully closing PDB 204, which, according to embodiments, includes steps 306 and 308 of flowchart 300.

At step 306, the particular database server instance leaves the particular DLM domain that corresponds to the particular pluggable database. For example, in response to detecting a trigger event that precipitates forceful closure of PDB 204, database server instance 142 leaves the DLM domain for PDB 204 by broadcasting a message to the other database server instances (i.e., instance 152 and instance 162) managed by DBMS 130 that instance 142 is no longer part of the DLM domain for PDB 204. Such a broadcast informs the other instances of the potential that PDB 204 needs to be recovered. Also, database server instance 142 causes its information to be taken out of the bitmap (of PDB open bitmaps 222) that corresponds to PDB 204. Furthermore, according to embodiments, database server instance 142 deletes (or marks invalid) lock structure 246, which holds information for locks that instance 142 has taken out for PDB 204.

At step 308, one or more dirty buffers, storing data of the particular pluggable database, are dropped. For example, in response to database server instance 142 detecting the trigger event that triggers forceful closure of PDB 204, instance 142 drops all buffers (i.e., from buffer cache 242), including dirty buffers, that store information for PDB 204. According to embodiments, data stored in buffer cache 242 for PDB 204 may be data blocks, portions of data blocks, etc. A buffer cache records changes, to data blocks, that have not yet been written to disk. For example, changes to data blocks occur when a client performs a data manipulation operation to modify/add/remove rows of a table. The buffers storing data for PDB 204 are dropped since forceful closure of a PDB does not involve writing data to disk.

According to embodiments, other actions are also performed in response to the database server instance detecting the trigger event. For example, in response to detecting a triggering event that triggers forceful closure of PDB 204, database server instance 142 causes the DLM domain corresponding to PDB 204 to be marked invalid. Marking the DLM domain that corresponds with PDB 204 invalid may be performed in any number of ways, e.g., by setting a variable within the data for the DLM domain, by storing an indication that the DLM domain is invalid within control file 220, etc. Control file 220 is a shared file accessible by any database server instance that serves database 170.

According to embodiments, control file 220 stores one or more lists of one or more server instances that have forcefully closed given pluggable databases before automatic recovery of the PDBs respectively kicks in, or before the last server instance that had opened the PDB (i.e. joined the PDB's DLM domain) closed the PDB. Such a list is useful for automatic recovery of a PDB to identify redo operations for the PDB based on the redo threads, for listed server instances, are needed for automatic recovery of the PDB. If a list for a particular PDB is not empty, then it is an indication that the particular PDB was forcefully closed by the listed database server instance(s).

However, if a list for a particular PDB is empty, then the particular DLM domain may or may not be valid. The list for a particular PDB being empty indicates that forceful closure of the PDB has not occurred since the last time the list was cleared (or since the list was initiated). For example, it is possible that a database server instance has crashed and the PDB's DLM domain became invalid because of the crashed instance (i.e., because that instance was a member of the PDB DLM domain before the crash).

If the list for a particular PDB is not empty, then it does not necessarily mean that the PDB's DLM domain transitioned from valid to invalid due to forceful closure of the PDB. For example, it is possible that the PDB's DLM domain became invalid due to an instance crash, and then before that crashed instance was recovered, the one or more database server instances in the list, for the PDB in control file 220, forcefully closed the PDB and the PDB's DLM domain remains invalid.

According to embodiments, instance 142 drops dirty buffers storing data for PDB 204 only after the DLM domain for PDB 204 is marked as invalid. Marking the DLM domain for PDB 204 as invalid allows discarding of dirty buffers from buffer cache 242 because the invalid status of the DLM domain will cause automatic recovery of PDB 204, as described in further detail below.

Furthermore, in response to detecting a triggering event that triggers forceful closure of PDB 204, database server instance 142 disallows any further changes to PDB 204. According to an embodiment, database server instance 142 disallows further changes to PDB 204 by causing termination of all client sessions connected to PDB 204 and instructing the DLM domain for PDB 204 to cease granting lock requests for PDB 204 (which removes all database-level access permissions). According to an embodiment, disallowing further changes to a PDB is performed before marking the corresponding DLM domain invalid.

According to embodiments, in response to database server instance 142 detecting the trigger event that triggers forceful closure of PDB 204, instance 142 includes, in control file 220, information indicating a particular redo thread number that uniquely identifies the redo thread within redo log(s) 210 that is associated with instance 142, since instance 142 is the instance that is forcefully closing PDB 204. This information is persistent, since it is recorded to control file 220 that is on disk, and (as explained in further detail below) communicates to the nodes of multi-node DBMS 130 the need to do recovery for PDB 204. For example, instance 152 receives a broadcast sent by instance 142 indicating that the instance is leaving the DLM domain for PDB 204. In response to receiving the broadcast, instance 152 accesses control file 220 to determine whether the DLM domain for PDB 204 is marked invalid due to PDB forceful closure. In this way, instances may determine that PDB 204 requires recovery.

In control file 220, instance 142 also includes information indicating what range of redo entries within the identified redo thread is required to recover PDB 204. This information includes a snapshot of the instance-wide checkpoint for the time that the forceful closure of PDB 204 commenced, i.e., the recovery start-point. Also, the information includes an end-point for the recovery, which is the position in the redo thread at the time that all activity in PDB 204 was disallowed. Clearly, instance 142 records the end-point for recovery after disallowing further changes to PDB 204, since the end-point must mark the end of changes being made to PDB 204.

If a database server instance has only read access (and no write access) to a PDB, then it is not possible for the instance to make changes to the PDB's files. Thus, forcefully closing a PDB by an instance that has read-only access to the PDB is simplified, and requires killing all client sessions connected to the PDB before doing normal operations to close a PDB that is open read only.

Forceful closure of a PDB by a database server instance according to flowchart 300 does not forcefully close the database server instance serving the PDB. Thus, other PDBs being served by the instance, such as PDB 206 also being served by server instance 142, remain accessible by the instance. The fact that a database server instance maintains all information for a connection with a particular PDB in a PDB-specific DLM domain allows the instance to leave the DLM domain for the PDB when there is a problem with accessing the PDB, without affecting other connections with other PDBs (since locks for other PDBs are also maintained in respective PDB-specific DLM domains).

Automatic Recovery of a Forcefully Closed Pluggable Database

Forceful closure of a PDB may cause changes being made to the PDB (i.e., by the instance that forcefully closed the PDB) to be lost because the changes had not yet been made persistent at the time of forceful closure. As such, recovery of the forcefully-closed PDB should be performed prior to continued use of the PDB resources. FIG. 4 depicts a flowchart 400 for automatically recovering a pluggable database that has been forcefully closed.

At step 402, a particular database server instance detects that a particular DLM domain, associated with a particular pluggable database of a plurality of pluggable databases within a container database, is marked invalid. Specifically, automatic recovery of a PDB (that has a DLM domain marked as invalid) is initiated when a database server instance, that has at least initiated joining the DLM domain that corresponds to the PDB, attempts to access or initiate contact with the PDB and, in so doing, detects that the DLM domain for the PDB is marked as invalid. Thus, marking the DLM domain of a PDB as invalid (i.e., in connection with forcefully closing the PDB) ensures that changes lost from forceful closure of the PDB will be recovered prior to continued use of the PDB by any database server instance. According to embodiments, if the PDB is no longer open anywhere in the cluster (i.e., there are no domain members for the DLM domain associated with the PDB), then automatic recovery of the PDB is disabled until the PDB is again opened.

The DLM domain associated with each of one or more PDBs may be marked as invalid at any given time. A particular recovery node may recover one or more of the PDBs with DLM domains that are marked invalid due to forceful closure of the PDB from any other instance. According to embodiments, the DLM domain, of a PDB that has been forcefully closed, picks a database server instance that is a member of the DLM domain to do automatic recovery of the PDB. If the PDB's DLM domain has become invalid due to instance death or forceful closure of a corresponding CDB, then there is no need for PDB-level automatic recovery. The PDB's DLM domain is recovered together with the instance recovery or CDB recovery.

To illustrate automatic recovery of a PDB in the context of the example forceful closure of PDB 204 given above, database server instance 152 attempts to access the resources of PDB 204 after instance 142 has marked the DLM domain of PDB 204 as invalid. In the course of the attempt to access the resources of PDB 204, database server instance 152 detects that the DLM domain for PDB 204 is marked as invalid. For example, instance 152 determines, from information in control file 220, that the DLM domain for PDB 204 is currently marked as invalid due to the forceful closure of PDB 204 by instance 142 as part of the handling of PDB 204 by instance 142 described above.

At step 404, in response to the particular database server instance detecting that the particular DLM domain is marked invalid, the particular database server instance automatically recovers the particular pluggable database. For example, detecting that the DLM domain for PDB 204 is marked as invalid triggers database server instance 152 to perform automatic recovery of PDB 204. According to embodiments, performing automatic recovery of a PDB includes one or more of steps 406-414 of flowchart 400.

At step 406, information indicating the following is retrieved: a particular redo thread of a plurality of redo threads of a redo log, and a range of entries in the particular redo thread. For example, instance 152 accesses control file 220 to determine one or more redo threads (associated with one or more database server instances that forcefully closed the invalid-marked PDB, e.g., PDB 204) in redo log(s) 210 required for recovery operations. More specifically, multiple instances may have forcefully closed PDB 204, requiring recovery of PDB 204 based on changes made in all of those multiple instances (all of which would be indicated in control file 220). Instance 152 also retrieves, from control file 220, the one or more ranges of redo entries, from the indicated redo threads, that are required to recover PDB 204.

In the example below, recovery is described for the forceful closure of PDB 204 by instance 142, but recovery may also be based on information generated by other instances that have also forcefully closed PDB 204, which recovery is performed in the same manner as described below.

At step 408, one or more recovery data blocks are identified from the particular redo thread. For example, database server instance 152 reads from the redo thread for instance 142, i.e., within the determined range of redo entries for the thread. Instance 152 determines, from the information in the redo thread, a set of one or more recovery data blocks, which is the set of data blocks from PDB 204 that are changed in the indicated range of redo entries.

At step 410, data for a latest version of the one or more recovery data blocks is fetched. For example, for each recovery data block, database server instance 152 claims a recovery lock from the DLM domain of PDB 204 and fetches the latest version of the block (either from disk or from a buffer cache of a database server instance in the cluster of multi-node DBMS 130).

At step 412, one or more changes indicated in redo entries, that are recorded in the particular redo thread within the range of entries, are replayed in the data for the latest version of the one or more recovery data blocks, to produce one or more recovered data blocks. For example, server instance 152 recovers lost changes to a copy of the one or more recovery blocks by replaying the missing changes recorded in the relevant range of redo entries of the redo thread for database server instance 142. The copy of the data blocks in which the lost changes have been replayed are considered the recovered data blocks.

At step 414, the one or more recovered data blocks are stored to disk. For example, after instance 152 replays all of the lost changes to the one or more recovered data blocks, instance 152 writes the recovered data blocks to disk, which makes the changes persistent. Instance 152 then releases all of the recovery locks obtained for the one or more recovery blocks.

According to embodiments, after identifying the one or more recovery data blocks and obtaining recovery locks on the one or more recovery data blocks, database server instance 152 validates the DLM domain for PDB 204, which allows activity on blocks not in the recovery set to resume. As such, the DLM domain for PDB 204 stays invalid until the recovery instance (i.e., instance 152) has determined the complete set of buffers that the recovery instance needs to recover for PDB 204, and has locked down all access to the data blocks in the recovery set. According to embodiments, validation occurs before the blocks are recovered, which allows recovery of the blocks to occur concurrently with any accesses that may occur to the blocks that do not require recovery, since these accesses can occur from instances that still have PDB 204 open.

Finally, instance 152 advances the checkpoints of the files for PDB 204 and the state for PDB 204 recorded in control file 220 is updated to indicate the completion of the recovery.

During automatic recovery of a forcefully closed PDB, it is possible for the PDB DLM domain to receive a new invalidation before the recovery instance validates the domain. If the new invalidation is due to a forceful closure of the PDB, recovery of the PDB restarts and thus finds additional redo entries to recover (as described above). However, if the new invalidation is due to the forceful closure or death of a database server instance, then the database server instance is first recovered before the PDB recovery is restarted. The recovery of a database server instance will not perform any recovery that is needed for an individual PDB that was forcefully closed.

Recovering a Forcefully Closed Database Server Instance

According to embodiments, a recovery server instance also performs recovery of a database server instance, such as instance 162, that has been forcefully closed. According to embodiments, a database server instance is associated with a DLM domain that is distinct from any other DLM domain, including being distinct from the DLM domains associated with the PDBs contained in a CDB being accessed by the database server instance.

To illustrate recovery of a database server instance, if instance 162 is forcefully closed or crashed, one of the remaining instances detects the failure of instance 162 and marks the DLM domain associated with instance 162 as invalid, and one of the remaining instances is designated as the recovery instance for such instance failure. If database server instance 152 is the recovery instance tasked with recovering instance 162, instance 152 determines what redo threads in redo log(s) 210 and also what ranges of redo entries are required to recover instance 162. Database server instance 152 also determines which (if any) PDBs have been forcefully closed and are in need of recovery.

For each PDB (e.g., included in CDB 230) that has not been forcefully closed, recovery instance 152 temporarily joins the DLM domain corresponding to the PDB (unless instance 152 is already a member of that DLM domain, i.e., because instance 152 is serving the PDB associated with the DLM domain at the time of recovering instance 162).

Database server instance 152 reads the relevant ranges of the indicated redo threads, and, from the data in redo log(s) 210, determines a set of data blocks (called the "recovery set") with lost changes from instance 162. For each block in the recovery set, instance 152 claims a recovery lock from the DLM domain corresponding to instance 162 and fetches the latest version of the block (either from disk or a buffer cache of a database server instance).

According to embodiments, database server instance 152 then validates the DLM domain associated with instance 162 and also validates each of the temporarily joined PDB DLM domains, which allows activity on blocks that are not in the recovery set to resume.

Database server instance 152 recovers the lost changes to the blocks in the recovery set by replaying the missing changes recorded in the relevant ranges of redo log(s) 210. After all of the lost changes are recovered, instance 152 writes the recovered blocks to disk to make them persistent and releases all of the recovery locks. Instance 152 then advances the checkpoints of the recovered files, after which all the temporary PDB DLM domain memberships are removed.

After recovery of the database server instance, the recovery node initiates recovery of all of the PDBs with DLM domains that have been detected as marked invalid due to PDB forceful closure, as described above.

During recovery of a CDB, it is possible for one the PDB DLM domains that have been temporarily joined to become newly invalid before recovery has validated them. When that occurs, recovery cancels all the temporary PDB DLM domain memberships and restarts recovery of the CDB node as described above (during which, of course, the recovery instance will find one or more additional PDBs that have been forcefully closed).

Forceful PDB Closure in a Single-Instance Environment

According to embodiments, forceful closure of a PDB is performed in single-instance (e.g., non-RAC) environments. In a single-instance environment, there is only one database server instance serving the database at any given time. In such an environment, when a PDB is forcefully closed, the system goes through a similar workflow as with the PDB forceful closure in a multi-database server instance environment as described above, omitting notification of DLM and modification of a control file (to include relevant information needed for automatic PDB recovery). In such an environment, no instance will serve the PDB after the PDB is forcefully closed by the only database server instance, in a manner similar to the case in a multi-instance environment when a PDB is forcefully closed in by the only instance that serves the PDB in the environment.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
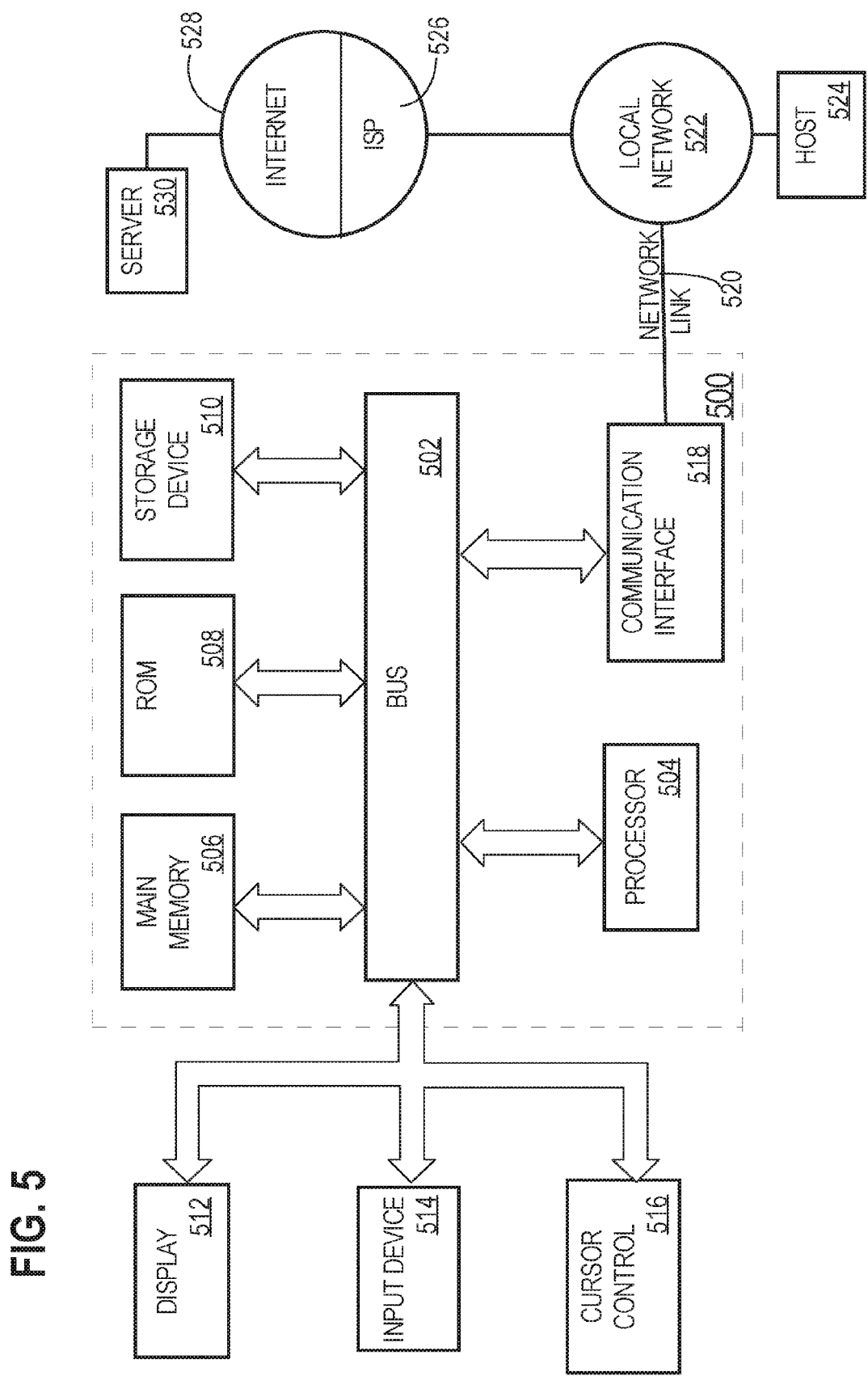
FIG. 5 is a block diagram of a computer system on which embodiments may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    a particular database server instance accessing a particular pluggable database of a plurality of pluggable databases within a container database;
    wherein each pluggable database of the plurality of pluggable databases is associated with a distinct corresponding distributed lock manager (DLM) domain that corresponds to the pluggable database;
    wherein the particular database server instance accessing the particular pluggable database is based, at least in part, on the particular database server instance being a member of a particular DLM domain that corresponds to the particular pluggable database;
    after the particular database server instance accessing the particular pluggable database, the particular database server instance detecting a trigger event that triggers forceful closure of the particular pluggable database;
    in response to detecting the trigger event, the particular database server instance performing:
        leaving the particular DLM domain that corresponds to the particular pluggable database, and
        dropping one or more dirty buffers storing data of the particular pluggable database; and
    the particular database server instance maintaining access to one or more other pluggable databases, of the plurality of pluggable databases, during the steps of detecting, marking, and leaving;
    wherein the method is performed by one or more computing devices.

2. The method of claim 1, wherein the particular database server instance accessing the particular pluggable database comprises:
    the particular database server instance obtaining a lock on a particular resource of the particular pluggable database;
    wherein the lock is scoped to the particular DLM domain that corresponds to the particular pluggable database; and
    after the particular database server instance obtaining the lock on the particular resource, the particular database server instance accessing the particular resource.

3. The method of claim 1, further comprising, prior to the particular database server instance accessing the particular pluggable database, the particular database server instance joining the particular DLM domain that corresponds to the particular pluggable database.

4. The method of claim 3, wherein the particular database server instance joining the particular DLM domain that corresponds to the particular pluggable database further comprises the particular database server instance performing one or more of:
    causing an identifier of the particular database server instance to be added to a bitmap that lists members of the particular DLM domain;
    broadcasting a message, to one or more other database server instances, that the particular database server instance has joined the particular DLM domain; or
    creating a lock structure for the particular DLM domain.

5. The method of claim 1, wherein the particular database server instance maintaining access to one or more other pluggable databases, of the plurality of pluggable databases, further comprises the particular database server instance maintaining membership of one or more other DLM domains, other than the particular DLM domain, that respectively correspond to the one or more other pluggable databases.

6. The method of claim 1, wherein the trigger event comprises detecting one or more of:
    a client command to forcefully close the particular pluggable database;
    inaccessibility of resources of the particular pluggable database;
    resources of the particular pluggable database include one or more fatal abnormalities;
    a procedure internal to the particular database server instance that requires forceful closure of the particular pluggable database;
    forceful closure of a database server instance that is a member of the particular DLM domain; or
    forceful closure of the container database that contains the particular pluggable database.

7. The method of claim 1, further comprising:
    in response to detecting the trigger event, the particular database server instance performing one or more of:
        disallowing further modification of the particular pluggable database;
        recording information, in a control file accessible by one or more other database server instances, that identifies the particular database server instance as forcefully closing the particular DLM domain;

recording information, in the control file, that identifies a range, in a redo thread of a redo log, of entries required for recovery of the particular pluggable database, wherein the redo thread stores change information for the particular database server instance.

8. The method of claim 1, further comprising:
in response to detecting the trigger event, the particular database server instance further performing: marking invalid the particular DLM domain that corresponds to the particular pluggable database;
after the particular database server instance marking invalid the particular DLM domain that corresponds to the particular pluggable database;
a second database server instance detecting that the particular DLM domain, that corresponds to the particular pluggable database, is marked invalid;
in response to the second database server instance detecting that the particular DLM domain that corresponds to the particular pluggable database is marked invalid, the second database server instance automatically recovering the particular pluggable database.

9. A method comprising:
a particular database server instance detecting that a particular DLM domain, associated with a particular pluggable database of a plurality of pluggable databases within a container database, is marked invalid;
wherein each pluggable database of the plurality of pluggable databases is associated with a corresponding DLM domain that corresponds to the pluggable database;
in response to the particular database server instance detecting that the particular DLM domain is marked invalid, the particular database server instance automatically recovering the particular pluggable database, wherein recovering the particular pluggable database comprises:
retrieving information indicating: a particular redo thread of a plurality of redo threads of a redo log, and a range of entries in the particular redo thread;
identifying, from the particular redo thread, one or more recovery data blocks;
fetching data for a latest version of the one or more recovery data blocks;
replaying, in the data for the latest version of the one or more recovery data blocks, one or more changes indicated in redo entries that are recorded in the particular redo thread within the range of entries, to produce one or more recovered data blocks; and
storing the one or more recovered data blocks to disk;
wherein the method is performed by one or more computing devices.

10. The method of claim 9, wherein the particular redo thread stores redo entries for a database server instance that caused the particular DLM domain to be marked invalid prior to the particular database server instance detecting that the particular DLM domain is marked invalid.

11. The method of claim 9, wherein while the particular database server instance detects that the particular DLM domain is marked invalid, the particular database server instance is a member of the particular DLM domain that corresponds to the particular pluggable database.

12. The method of claim 9, wherein the particular database server instance detects that the particular DLM domain is marked invalid in response to the particular database server instance initiating a connection with the particular pluggable database.

13. The method of claim 9, wherein the particular database server instance automatically recovering the particular pluggable database further comprises:
prior to fetching data for the latest version of the one or more recovery data blocks, the particular database server instance automatically claiming, for each data block in the one or more recovery data blocks, a recovery lock from the particular DLM domain that corresponds to the particular pluggable database; and
after storing the one or more recovered data blocks to disk, the particular database server instance automatically releasing the recovery lock for each data block in the one or more recovery data blocks.

14. The method of claim 9, further comprising validating the particular DLM domain after identifying, from the particular redo thread, the one or more recovery data blocks.

15. One or more non-transitory computer-readable media storing instructions, which, when executed by one or more processors, cause:
a particular database server instance accessing a particular pluggable database of a plurality of pluggable databases within a container database;
wherein each pluggable database of the plurality of pluggable databases is associated with a distinct corresponding distributed lock manager (DLM) domain that corresponds to the pluggable database;
wherein the particular database server instance accessing the particular pluggable database is based, at least in part, on the particular database server instance being a member of a particular DLM domain that corresponds to the particular pluggable database;
after the particular database server instance accessing the particular pluggable database, the particular database server instance detecting a trigger event that triggers forceful closure of the particular pluggable database;
in response to detecting the trigger event, the particular database server instance performing:
leaving the particular DLM domain that corresponds to the particular pluggable database, and
dropping one or more dirty buffers storing data of the particular pluggable database; and
the particular database server instance maintaining access to one or more other pluggable databases, of the plurality of pluggable databases, during the steps of detecting, marking, and leaving.

16. The one or more non-transitory computer-readable media of claim 15, wherein the particular database server instance accessing the particular pluggable database comprises:
the particular database server instance obtaining a lock on a particular resource of the particular pluggable database;
wherein the lock is scoped to the particular DLM domain that corresponds to the particular pluggable database; and
after the particular database server instance obtaining the lock on the particular resource, the particular database server instance accessing the particular resource.

17. The one or more non-transitory computer-readable media of claim 15, wherein the instructions further include instructions which, when executed by one or more processors, cause, prior to the particular database server instance accessing the particular pluggable database, the particular database server instance joining the particular DLM domain that corresponds to the particular pluggable database.

18. One or more non-transitory computer-readable media storing instructions, which, when executed by one or more processors, cause:
 a particular database server instance detecting that a particular DLM domain, associated with a particular pluggable database of a plurality of pluggable databases within a container database, is marked invalid;
 wherein each pluggable database of the plurality of pluggable databases is associated with a corresponding DLM domain that corresponds to the pluggable database; and
 in response to the particular database server instance detecting that the particular DLM domain is marked invalid, the particular database server instance automatically recovering the particular pluggable database;
 wherein recovering the particular pluggable database further comprises:
  retrieving information indicating: a particular redo thread of a plurality of redo threads of a redo log, and a range of entries in the particular redo thread;
  identifying, from the particular redo thread, one or more recovery data blocks;
  fetching data for a latest version of the one or more recovery data blocks;
  replaying, in the data for the latest version of the one or more recovery data blocks, one or more changes indicated in redo entries that are recorded in the particular redo thread within the range of entries, to produce one or more recovered data blocks; and
  storing the one or more recovered data blocks to disk.

19. The one or more non-transitory computer-readable media of claim 18, wherein the particular redo thread stores redo entries for a database server instance that caused the particular DLM domain to be marked invalid prior to the particular database server instance detecting that the particular DLM domain is marked invalid.

20. The one or more non-transitory computer-readable media of claim 18, wherein while the particular database server instance detects that the particular DLM domain is marked invalid, the particular database server instance is a member of the particular DLM domain that corresponds to the particular pluggable database.

21. The one or more non-transitory computer-readable media of claim 17, wherein the particular database server instance joining the particular DLM domain that corresponds to the particular pluggable database further comprises the particular database server instance performing one or more of:
 causing an identifier of the particular database server instance to be added to a bitmap that lists members of the particular DLM domain;
 broadcasting a message, to one or more other database server instances, that the particular database server instance has joined the particular DLM domain; or
 creating a lock structure for the particular DLM domain.

22. The one or more non-transitory computer-readable media of claim 15, wherein the particular database server instance maintaining access to one or more other pluggable databases, of the plurality of pluggable databases, further comprises the particular database server instance maintaining membership of one or more other DLM domains, other than the particular DLM domain, that respectively correspond to the one or more other pluggable databases.

23. The one or more non-transitory computer-readable media of claim 15, wherein the trigger event comprises detecting one or more of:
 a client command to forcefully close the particular pluggable database;
 inaccessibility of resources of the particular pluggable database;
 resources of the particular pluggable database include one or more fatal abnormalities;
 a procedure internal to the particular database server instance that requires forceful closure of the particular pluggable database;
 forceful closure of a database server instance that is a member of the particular DLM domain; or
 forceful closure of the container database that contains the particular pluggable database.

24. The one or more non-transitory computer-readable media of claim 15, wherein the instructions further comprise instructions which, when executed by one or more processors, cause:
 in response to detecting the trigger event, the particular database server instance performing one or more of:
 disallowing further modification of the particular pluggable database;
 recording information, in a control file accessible by one or more other database server instances, that identifies the particular database server instance as forcefully closing the particular DLM domain;
 recording information, in the control file, that identifies a range, in a redo thread of a redo log, of entries required for recovery of the particular pluggable database, wherein the redo thread stores change information for the particular database server instance.

25. The one or more non-transitory computer-readable media of claim 15, wherein the instructions further comprise instructions which, when executed by one or more processors, cause:
 in response to detecting the trigger event, the particular database server instance further performing: marking invalid the particular DLM domain that corresponds to the particular pluggable database;
 after the particular database server instance marking invalid the particular DLM domain that corresponds to the particular pluggable database:
 a second database server instance detecting that the particular DLM domain, that corresponds to the particular pluggable database, is marked invalid;
 in response to the second database server instance detecting that the particular DLM domain that corresponds to the particular pluggable database is marked invalid, the second database server instance automatically recovering the particular pluggable database.

26. The one or more non-transitory computer-readable media of claim 18, wherein the particular database server instance detects that the particular DLM domain is marked invalid in response to the particular database server instance initiating a connection with the particular pluggable database.

27. The one or more non-transitory computer-readable media of claim 18, wherein the particular database server instance automatically recovering the particular pluggable database further comprises:
 prior to fetching data for the latest version of the one or more recovery data blocks, the particular database server instance automatically claiming, for each data block in the one or more recovery data blocks, a recovery lock from the particular DLM domain that corresponds to the particular pluggable database; and
 after storing the one or more recovered data blocks to disk, the particular database server instance automatically releasing the recovery lock for each data block in the one or more recovery data blocks.

28. The one or more non-transitory computer-readable media of claim 18, wherein the instructions further comprise instructions which, when executed by one or more processors, cause validating the particular DLM domain after identifying, from the particular redo thread, the one or more recovery data blocks.

\* \* \* \* \*

UNITED STATES PATENT AND TRADEMARK OFFICE
CERTIFICATE OF CORRECTION

PATENT NO. : 9,928,147 B2  
APPLICATION NO. : 15/014969  
DATED : March 27, 2018  
INVENTOR(S) : Li et al.

Page 1 of 1

It is certified that error appears in the above-identified patent and that said Letters Patent is hereby corrected as shown below:

On page 2, Column 1, under Other Publications, Line 3, delete "agonfigure" and insert -- Configure --, therefor.

In Column 19, Line 14, in Claim 8, delete "database;" and insert -- database: --, therefor.

Signed and Sealed this  
Twenty-eighth Day of August, 2018

Andrei Iancu  
*Director of the United States Patent and Trademark Office*